(12) United States Patent
Martinez Martinez et al.

(10) Patent No.: US 9,371,572 B2
(45) Date of Patent: Jun. 21, 2016

(54) PROCESS FOR MANUFACTURE OF NANOMETRIC, MONODISPERSE, STABLE METALLIC SILVER AND A PRODUCT OBTAINED THEREFROM

(75) Inventors: Jesús Manuel Martinez Martinez, Guadalupe (MX); Ricardo Benavides Pérez, Monterrey (MX); José Gertrudis Bocanegra Rojas, Monterrey (MX); Facundo Ruiz, San Luis Potosi (MX); Alma Guadalupe Vázquez Durán, San Luis Potosi (MX); Gabriel Alejandro Martinez Castañon, San Luis Potosi (MX)

(73) Assignee: Servicios Administrativos Penoles S.A. de C.V., Mexico City (MX)

( * ) Notice: Subject to any disclaimer, the term of this patent is extended or adjusted under 35 U.S.C. 154(b) by 941 days.

(21) Appl. No.: 12/520,537

(22) PCT Filed: Apr. 3, 2007

(86) PCT No.: PCT/MX2007/000047
§ 371 (c)(1),
(2), (4) Date: Jan. 27, 2010

(87) PCT Pub. No.: WO2008/075933
PCT Pub. Date: Jun. 26, 2008

(65) Prior Publication Data
US 2010/0143183 A1    Jun. 10, 2010

(30) Foreign Application Priority Data

Dec. 20, 2006    (MX) .................... NL/a/2006/000107

(51) Int. Cl.
*B22F 9/18*      (2006.01)
*C22B 3/00*      (2006.01)
(Continued)

(52) U.S. Cl.
CPC ............... *C22B 11/04* (2013.01); *B22F 1/0022* (2013.01); *B22F 9/24* (2013.01); *B82Y 30/00* (2013.01);
(Continued)

(58) Field of Classification Search
CPC ................................ B22F 1/0022; B22F 9/24
USPC ..................................................... 75/345, 370
See application file for complete search history.

(56) References Cited

U.S. PATENT DOCUMENTS

2006/0254387 A1    11/2006    Lee et al.

FOREIGN PATENT DOCUMENTS

CN            166914 A       3/2004
CN           1686646 A       4/2005
(Continued)

OTHER PUBLICATIONS

Sun et al. "Synthesis and characterization of DDP coated AG nanoparticles", Materials Sciences and Engineering, A (379), 2004, 378-383.*

(Continued)

*Primary Examiner* — Rebecca Lee
(74) *Attorney, Agent, or Firm* — Culhane Meadows PLLC; Kevin W. Grierson; J. Scott Anderson

(57) ABSTRACT

The present invention relates to a procedure for preparation by wet reduction method of nanometric particles of metallic silver, with diameter in the range of 1 to 100 nm and an average diameter of 20 to 40 nm, with monodispersion characteristics, stability greater than 12 months and in a wide range of concentrations. The process comprises 4 steps: a) preparation of the reducing agent solution, taken from the group of tannins and preferably being tannic acid; b) preparation of a solution of a soluble silver salt; c) reaction and, d) solid-liquid separation; the particle size is determined by the nature of the reducing agent and by the pH control of the currents. The final step is designed for separating and concentrating the material after which the user can prepare the product for integration thereof in the desired medium. The particles obtained are redispersable in different media, such as water, alkydalic and phenolic resins, nitrocellulose, polyurethane, vinylics, acrylics, alcohols and in a wide variety of organic and polymeric materials such as high and low density polyethylene, Nylon, ABS and/or mixtures thereof.

8 Claims, 3 Drawing Sheets

(51) Int. Cl.
  *B22F 1/00* (2006.01)
  *B22F 9/24* (2006.01)
  *B82Y 30/00* (2011.01)
  *C09C 1/62* (2006.01)
  *C22B 5/00* (2006.01)
  *C22C 5/06* (2006.01)

(52) U.S. Cl.
  CPC ... *C09C 1/62* (2013.01); *C22B 5/00* (2013.01); *C01P 2004/03* (2013.01); *C01P 2004/52* (2013.01); *C01P 2004/64* (2013.01)

(56) References Cited

FOREIGN PATENT DOCUMENTS

| CN | 1810422 A | 2/2006 |
|----|-----------|--------|
| EP | 1647345 A1 | 4/2006 |
| EP | 2103364 B1 | 9/2009 |
| JP | 5335688 A | 4/2010 |
| KR | 1020050040226 * | 5/2005 |
| MX | 321467 | 12/2006 |
| WO | 2008100163 A1 | 8/2008 |

OTHER PUBLICATIONS

Machine translation of KR1020050040226, 2005.*
Feng, Q., et al., Preparation and Dielectric Property of Ag-PVA Nano-Composite, Materials Science and Engineering, vol. B99, pp. 325-328 (2003).
Hy, J., et al., Preparation of Silver Nanoparticles by Photo-Reduction for Surface-Enhanced Raman Scattering, Think Solid Films, vol. 496, pp. 281-287 (2006) (translation of Abstract included).
Krylova, G., et al., Photochemical Preparation of Nanoparticles of Ag in Aqueous Solution and on the Surface of Mesoporous Silica, Theoretical and Experimental Chemistry, vol. 41, No. 2, pp. 105-110 (2005).
Kim & Chang, Transmittal of Certificate of Patent to the Applicants in Korea, enclosing Certificate of Patent KR 10-1197186 (Korea), granted Oct. 29, 2012, pp. 1-3.
State of Israel, Patent Office, Certificate of Patent to the Applicants, Israel Patent 199418, granted Jan. 31, 2015, pp. 1-2.
Gorodissky & Partners, Transmittal of Certificate of Patent to the Applicants, Russia Patent 2430169, published in the Official Bulletin on Sep. 27, 2011, pp. 1-3.
Tian, X., et al., Seedless, Surfactantless Photoreduction Synthesis of Silver Nanoplates, Materials Letters, vol. 60, pp. 828-830 (2006).

* cited by examiner

PROCESS FOR MANUFACTURE OF NANOMETRIC, MONODISPERSE, STABLE METALLIC SILVER AND A PRODUCT OBTAINED THEREFROM

FIELD OF THE INVENTION

The present invention is related to the processes for the preparation of metallic nanoparticles, and specifically a process for the preparation of nanometric, monodisperse, stable metallic silver particles in different media.

BACKGROUND OF THE INVENTION

It is well known that silver particles are used as bactericide and antiviral agents, and its function as a bactericide increases in a proportional inverse relation to the size of the particle, for that reason the nanoparticles are of special interest. This material also has applications in catalytic hydrogenization of organic compounds, among others.

To avoid confusion in the use of certain terms herein, "nanoparticle" is generally used to refer to particles that have a diameter equal to, or less than 100 nm; "monodispersion" is used to identify the particles with low variability in size, and "stability" is understood as the quality that the material has in not changing the size of the particles and monodispersion without applying mechanical or chemical means during the storage period.

In the prior art, there are known two types of processes for the fabrication of nanoparticles of metallic silver:

a) plasma via, where a rod of metallic silver is heated to vaporization, then the vaporized silver is cooled in a suitable atmosphere, obtaining a fine dust of metallic silver, (in an inert atmosphere) or a compound of silver associated to the nature of the atmosphere used.

b) wet reduction via, where a silver ion solution is submitted to a process of reduction, in the presence of surfactants and stabilizers to control the size of the product.

Recently there have been reports on the effect of the presence of light in applications for the reduction of silver by wet reduction ("Preparation of silver nanoparticles by photo-reduction for surface-enhanced Raman scattering"; Huiying Jia, Jiangbo Zeng, Wei Song, Jing An, Bing Zhao; Thin Solid Films 496 (2006) 281-287. "Photochemical preparation of nanoparticles of Ag in aqueous solution and on the surface of mesoporous silica"; G. V. Krylova, A. M. Eremenko, N. P. Smirnova, S. Eustis; Theoretical and experimental chemistry (2005) 41(2) 105-110), where the addition of surfactants and stabilizers is not necessary, since the metallic silver particles form on the surface of a substrate; the reaction lasts up to 3 hours.

Xuelin ("Seedless, surfactantless photoreduction synthesis of silver nanoplates"; Xuelin Tian, Kai Chen, Gengyu Cao; Materials Letters 60 (2006) 828-830) reports the use of sodium citrate as the reducing agent to obtain silver nanoparticles in the presence of light.

In other articles, the precipitation of metallic silver nanoparticles is mentioned, where the reaction can last from 8 to 24 hours (CN1810422, Gao, 2006). In other publications to accelerate the reaction, the mixture is heated to temperatures close to 100° C. (CN1686646, Liu, 2005; CN1669914, Luo, 2005).

It is clear that in the case of wet reduction processes, a significant problem exists in the selection of additives since they should be compatible between the surfactant used in the reaction and the application for which the nanoparticles are destined, or on the contrary, submit the product to a process to eliminate the surfactant; furthermore, the concentration of the additive in the reaction mixture needs to be controlled to influence the size of the silver nanoparticles; on the other hand, it is important to point out that the reaction times are relatively long, such that there is a wide variety in the distribution of particle size.

SUMMARY OF THE INVENTION

In view of the problems found in the prior art, it is an object of the present invention to provide a new process for the preparation of metallic silver particles.

Another object of the present invention is to provide a wet reduction process that simplifies the control of the nanoparticle sizes obtained.

Another object of the present invention is the production of monodisperse metallic silver nanoparticles.

Still another object of the present invention is the production of metallic silver nanoparticles with an average diameter of between 1 and 100 nm.

Another object of the present invention is the production of metallic silver nanoparticles with an average diameter of between 5 and 60 nm.

Another object of the present invention is the production of metallic silver nanoparticles with stability superior to twelve months.

Another object of the present invention is to provide a product of silver nanoparticles that disperse easily for a variety of applications.

Another object of the present invention is to provide a process by wet reduction via for the production of metallic silver nanoparticles in large concentrations.

BRIEF DESCRIPTION OF THE FIGURES

To better understand the subject matter of the invention, the description is accompanied by a series of figures that are illustrative of the reach of the same. They will be described as follows.

BRIEF DESCRIPTION OF THE INVENTION

Figure 1:
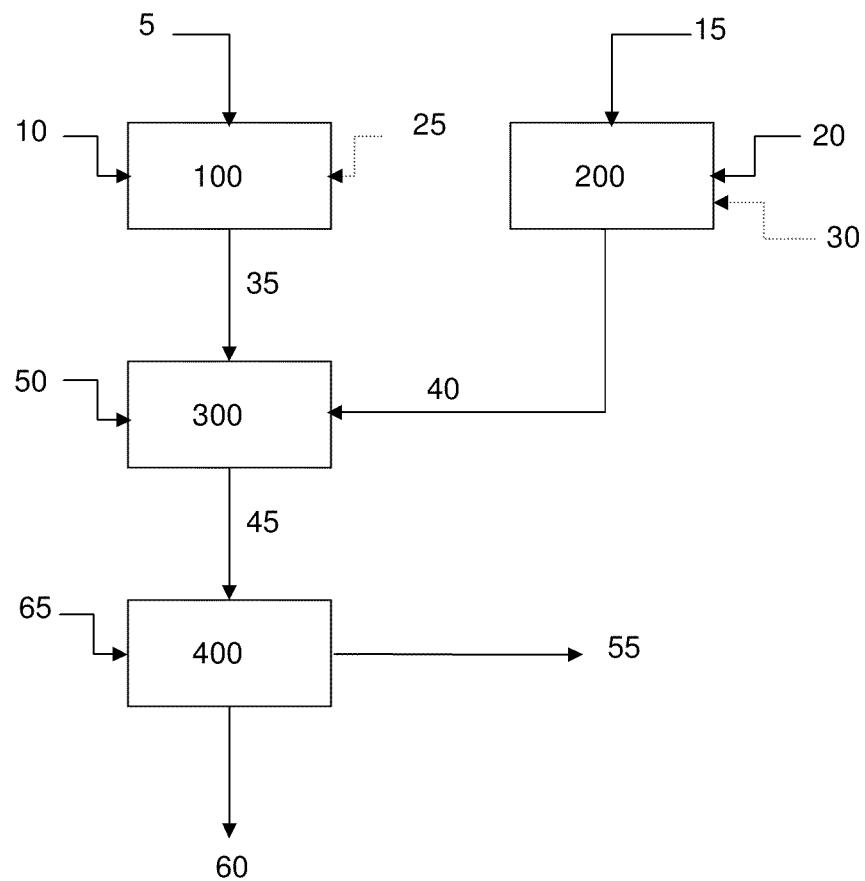
FIG. 1 is a block process diagram for obtaining the metallic silver nanoparticles of the invention.

The present invention is related with the wet reduction process for the preparation of nanometric particles of metallic silver, and the product obtained thereof. The particles have a diameter in a range from 1 to 100 nm, the average diameter between 20 and 40 nm, and the following characteristics: monodisperse, with a stability greater than 12 months and with a wide range of concentrations.

The process of the present invention requires as a raw material, a solution of soluble silver salts, such as sulfates, nitrates and others, having an pH adjusted in the alkaline range by the controlled addition of alkalis such as, hydroxide of sodium, potassium, ammonium, and ammonia. Tannins are used as the reducing agents, including in this category tannic acid.

An important aspect of the invention is related with the adequate control of the pH of the solutions before, during and after the reaction since it has a relevant affect on the size of the particle and its variability.

The main difference between the proposed process in the present invention and those in the state of the art is the use of tannins and preferably tannic acid as the reduction agent, that besides controlling the size of the particle to values less than 100 nm, it has the additional advantage of fulfilling the function of the surfactants and the stabilizers in the known processes, thus making their addition unnecessary and in this way, simplifying the production process, at the same time that it impedes the agglomeration of the nanoparticles produced during the reaction and the re-agglomeration after the steps of purification.

The process has 4 steps:

a) to prepare an aqueous solution of the reducing agent at a concentration from 0.01% to 20% in weight, the concentration and the quantity of the solution directly influences the efficiency of the reaction and the size of the particle obtained;

b) to prepare an aqueous solution of a silver salt with a concentration of from 0.01% to 20% in weight;

c) to mix the reducing solution and the silver solution in a reactor; during the reaction, the pH is controlled with ammonium hydroxide in values between 10.5 and 11.5; the residence time can be up to 1.0 hour, but in approximately 15 minutes a conversion of greater than 95% is reached;

d) to remove the nanoparticles metallic silver formed from the mother liquor by any technique of solid-liquid separation, such as decantation, centrifugation, filtration, etc.

It has been found that the reaction is accelerated with the presence of day light.

As it has been previously mentioned, the use of tannins or tannic acid as the reducing agent eliminates the need to use another type of additive to control the size of the nanoparticles that are obtained, nonetheless, there exists variations in the process described above that in addition to the use of tannins, allows for the control of the range of the average sizes, as is described as follows.

In one embodiment of the invention, the size of the nanoparticles is controlled through the adjustment of the pH of the silver salt solution in the alkaline range until a value of 11.5 by the addition of the ammonium hydroxide. It is observed that when the pH of this solution is not controlled before the reaction, the nanoparticles that result from the reaction will have an average particle size around 40 to 50 nm and the formation of silver oxide is detected, which reduces the yield of the process.

In another embodiment of the invention, the pH of the reducing solution is controlled in the alkaline range until a value of 11.5 through the addition of the ammonium hydroxide.

The modification of the pH in one or both of the solutions described in the previous models, before their mixture, has noticeable effects on the size of the nanoparticles in the final product.

The separation of the phases to obtain the nanoparticles free from the mother liquor is made easier if the "zeta potential" (that represents the electric charge on the surface of the particles and their integration with other particles) is changed, by the addition of flocculants or by the acidification of the solution until the flocculation of the nanoparticles.

The product obtained by the process or any other embodiment, is a wet paste, that has particles that are redispersible into different media such as water, alcohols, alkydalic and phenolic resins, nitrocellulose, polyurethane, vinylics, acrylics and in a wide variety of organic materials and polymers such as high and low density polyethylene, Nylon, ABS and or mixtures of the same.

DETAILED DESCRIPTION OF THE INVENTION

The present invention is related with a process by wet reduction for the preparation of nanometric particles of metallic silver through the reaction of two solutions, one of which is an aqueous solution of some soluble silver salt, selected from a group that includes sulfates and nitrates, and a reducing solution, from a reducing agent selected from the group of tannins, preferably being tannic acid.

The main advantage of using tannins and tannic acid in particular as the reduction agent in the aqueous solution, lies in the fact that besides controlling the particle size to values smaller than 100 nm, they replace the surfactants and stabilizers in the known processes, simplifying the process, at the same time preventing the agglomeration of the nanoparticles produced during the reaction and their re-agglomeration after the steps of purification.

It is necessary to maintain adequate control of the pH of the solutions before, during and after the reaction, to make sure the production of the nanoparticles have an average size within the defined range, and with little variation in their dimensions (monodisperse), as can be seen in Table 1 which includes the typical results with the different possibilities of the invention.

TABLE 1

Effect of the pH on the reducing solution and the silver salt solution on the average size of the nanoparticles.

| Solution of Silver salt | Reducing solution | |
|---|---|---|
| | With pH adjustment | Without pH adjustment |
| With pH adjustment | 10-20 nm | 20-30 nm |
| Without pH adjustment | 40-50 nm Formation of silver oxide | 40-50 nm Formation of silver oxide |

As it is evident from the data in Table 1, the effect of not adjusting the pH of the silver salt solution to the values that will be signaled later on, results in a product with average particle sizes relatively larger and in the formation of silver oxide, that on one hand reduces the yield of the process and on the other hand results in a "contaminated" product that will have a lower efficiency in some of the final applications.

Following will be presented the details of the procedure of the invention that is illustrated in FIG. 1, where the operations and the currents described are indicated by numbers in parenthesis.

Step 1. Preparation of the Reduction Solution (100)

Dissolve a reductant agent (5), selected from the group that includes tannins and preferably being tannic acid, in water (10) free from halogens, to form an aqueous solution (35) with a concentration from 0.01% to 20% in weight.

In an alternative embodiment, and according to that established in Table 1, adjust the pH in the reducing solution into the alkaline range until a maximum value of 11.5 through the addition of an hydroxide (25) selected from a group that includes hydroxides of sodium, potassium, ammonium, and ammonia, preferably being ammonium hydroxide.

Step 2. Preparation of the Silver Solution (200)

Dissolve a silver salt (15), selected from a group that includes sulfates and nitrates, and preferably being silver nitrate, in water (20) free of halogens, to form an aqueous solution (40) with a concentration from 0.01% to 20% in weight.

In an alternative embodiment, and according to that established in Table 1, to adjust the pH in the silver salt solution into alkaline range until a maximum value of 11.5 by the addition of an hydroxide (30) selected from a group that includes hydroxides of sodium, potassium, ammonium, and ammonia, preferably being ammonium hydroxide, due to its effect to be able to slow the ageing of the solution.

The aqueous silver solution preferably should be prepared immediately before realizing the reaction and a maximum of 15 minutes before its usage.

Step 3. Reaction and Production of the Metallic Silver Nanoparticles (300)

In a reactor, mix the reducing solution (35) and the silver salt solution (40) assuring an efficient mixture, under the conditions of room temperature and pressure, for a period of at least 15 minutes, which is the time sufficient enough to reach a conversion greater than 95%; the laboratory tests show that the presence of light has the effect of increasing the speed of the reaction, for that reason it is recommended to use a reactor with walls that allow for the passage of light.

Immediately after adding the reducing solution (35) and the silver salt solution (40), adjust the pH of the mixture by adding ammonium hydroxide (50) until the value is between 10.5 and 11.5, preferably 10.5.

The result of the reaction is a suspension (45) of monodisperse metallic silver nanoparticles.

Step 4. Separation from the Mother Liquor (400)

For the separation of the mother liquor (55) from the suspension of the silver nanoparticles (45) any method of solid-liquid separation can be used, such as sedimentation, filtration, or centrifugation. To ease the separation of phases, flocculants or acids (65) that modify the zeta potential can be used. Preferably, use an acid within the same functional group as that of the silver salt used.

The product (60) thus obtained is a wet paste of nanometric, stable, easily dispersible metallic silver, with low variability in the distribution of particle size (monodisperse) and with an average particle size in the range of 1 to 100 nm, depending on the means of preparation related with the adjustment of the pH before the reaction.

The product containing the silver nanoparticles (60), can be submitted to other washing processes with water or other organic solvents, monomers or resins, according to what is needed for the application of the final user.

As has been previously mentioned, the product obtained by the described process, including the preferred models is a wet paste in which the particles are re-dispersible in different media, such as water, alcohol, alkydalic and phenolic resins, nitrocellulose, polyurethane, vinylics, acrylics and in a wide variety of organic materials and polymers such as high and low density polyethylene, Nylon, ABS and or mixtures of the same.

Figure 2:
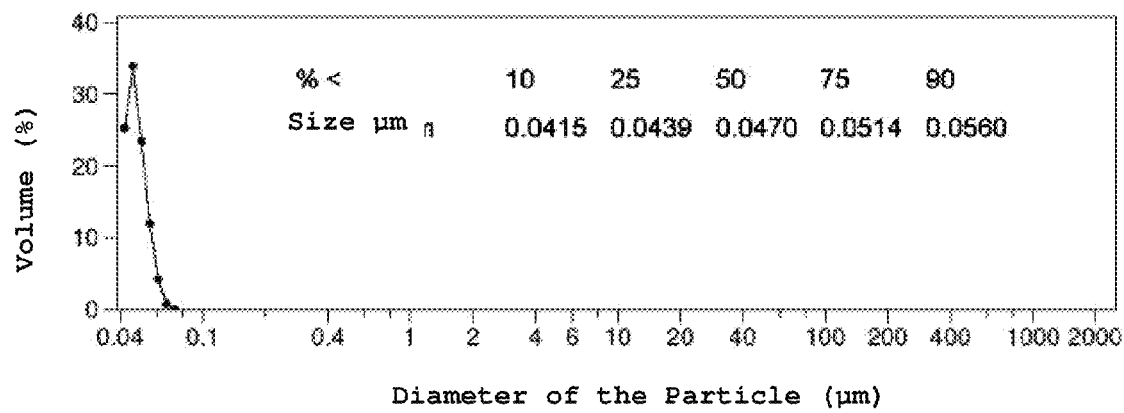
FIG. 2 is a graph that shows the distribution of the nanometric silver particles sizes in a product by the process of the invention.

FIG. 2 is a graph of the distribution of the size of the particle of the metallic silver in the paste obtained by the invention process, where the distribution of particle size can be observed in which the average ($D_{50}$) is 47.0 nm and where 90% of the particles have a size ($D_{10}$) greater than 41.5 nm and where 90% of the particles have a particle size ($D_{90}$) less than 56.0 nm. The measurements have been completed by a laser diffraction Coulter LS230 equipment.

Figure 3:
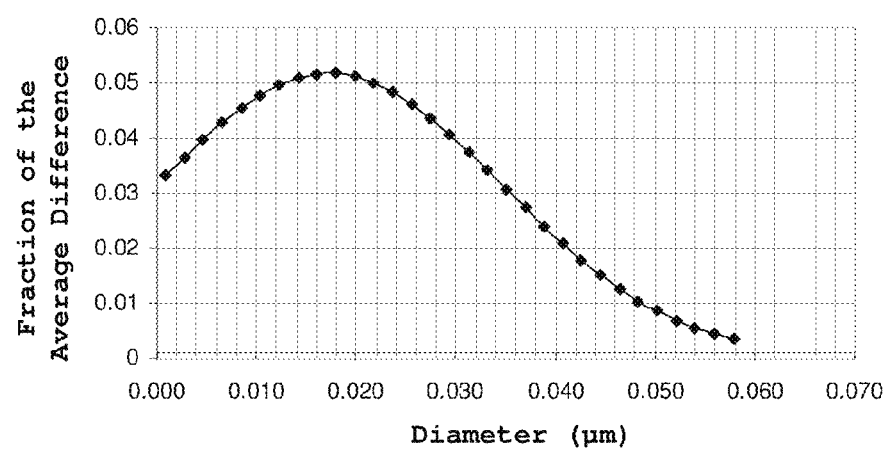
FIG. 3 is a graph that shows the distribution of the nanometric silver particle sizes in another product by the process of the invention.

FIG. 3 is a graph of the distribution of the particle sizes of nanometric silver obtained by the invention process where it shows the following distribution of particle sizes: $D_{10}$, 4.7 nm; $D_{50}$, 21.0 nm; $D_{90}$, 40.7 nm. The measurements were taken by an attenuation of ultrasound AcoustoSizer II equipment.

Figure 4:
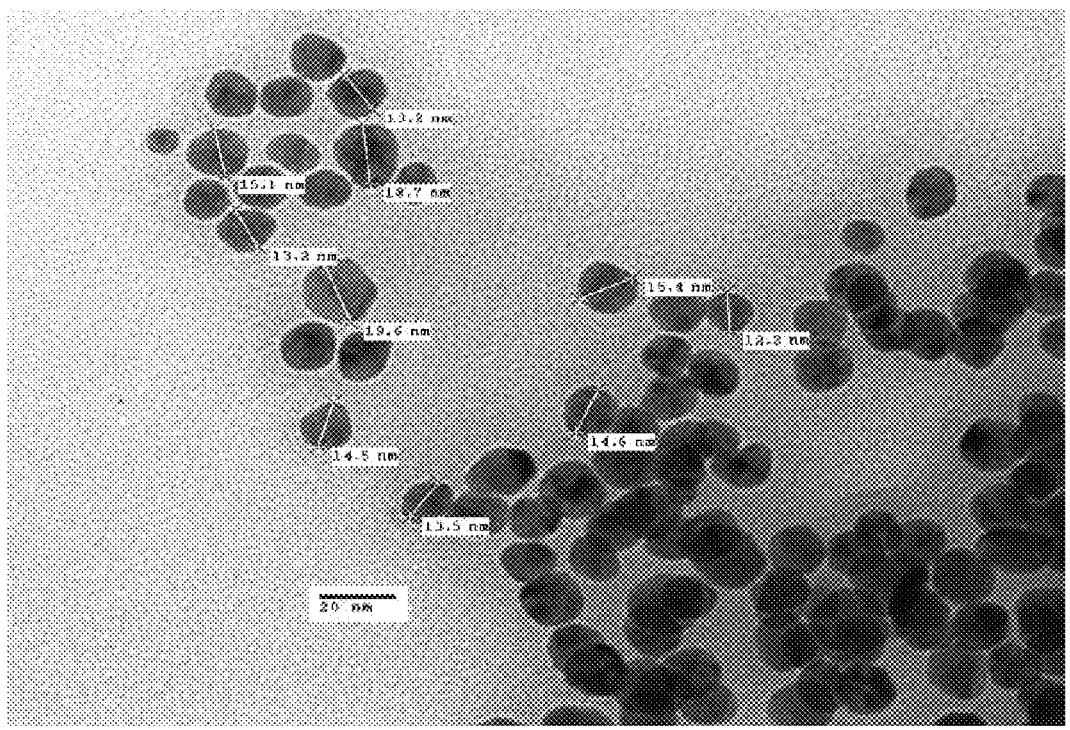
FIG. 4 is a micrography of nanometric and monodisperse metallic silver in a product prepared from the process described in the present invention.

FIG. 4 is a micrograph of the nanometric and monodisperse metallic silver product, with particle sizes between 10 and 20 nm, prepared by the procedure of the present invention.

Figure 5:
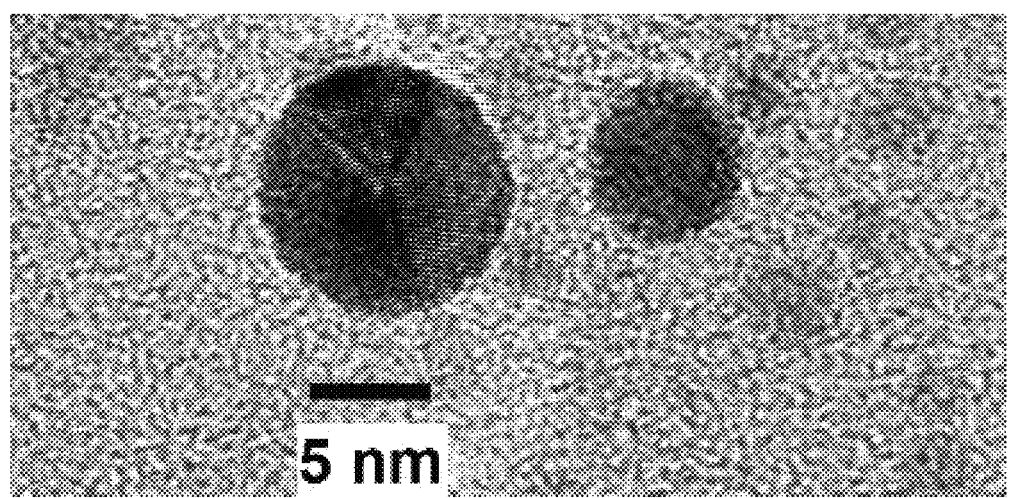
FIG. 5 is a micrography of the nanometric and monodisperse metallic silver, in another product prepared from the process described in the present invention.

FIG. 5 is a micrography of the nanometric and monodisperse metallic silver product with particle sizes between 5 and 20 nm, prepared by the process of the present invention, with which it is proved the range of particle sizes are between 1 and 100 nm.

The previous description for the process of the present invention reflects the necessary steps to be sure that the product obtained reaches the following qualities of the metallic silver nanoparticles: homogeny, stability, monodispersion, and others that have already been described, and furthermore including the preferred models; nonetheless, said description and the accompanying figures should be considered illustrative of the process and the product, and not limiting to the same. For a person with knowledge of the material, it will be evident that variations can be introduced in order to carry out the process of the invention, but said variations cannot be considered outside the reach of the present invention, which will be further described in the following Claims.

The invention claimed is:

1. A wet reduction process to produce monodisperse and stable nanoparticles of metallic silver, comprising the following steps:
   a) preparing an aqueous solution of silver salts at room temperature containing from 0.01% to 20% in weight of silver soluble salt, and adjusting the pH of the aqueous silver salts solution to a value between 10.5 and 11.5 by the addition of a first hydroxide;
   b) preparing an aqueous solution of a reducing agent at room temperature containing from 0.01% to 20% in weight of tannic acid, and adjusting the pH of the aqueous reducing agent solution to a value between 10.5 and 11.5 by the addition of a second hydroxide;
   c) mixing the aqueous solutions of silver salts and reducing agent to react, and adjusting the pH of the mixture to a value between 10.5 and 11.5 by the addition of a third hydroxide, to synthesize silver nanoparticles at room temperature; and
   d) separating the resulting mother liquor and the silver nanoparticles produced in the reaction, to obtain silver nanoparticles with average particle sizes from 10 nm to 20 nm.

2. The process to produce monodisperse and stable nanoparticles of metallic silver according to claim 1 wherein the first hydroxide is selected from the group consisting of hydroxide of sodium, hydroxide of potassium, hydroxide of ammonium, and ammonia.

3. The process to produce monodisperse and stable nanoparticles of metallic silver according to claim 1 wherein the silver salts solution is prepared no more than 15 minutes before the mixing step.

4. The process to produce monodisperse and stable silver metallic nanoparticles according to claim 1 wherein the mixing step takes place in the presence of light.

5. The process to produce monodisperse and stable metallic silver nanoparticles according to claim 1 wherein the mixing step has a duration of at least 15 minutes but not more than 30 minutes.

6. The process to produce monodisperse and stable metallic silver nanoparticles according to claim 1 wherein, during the mixing step, the progress of the reaction after 15 minutes is at least 95%.

7. The process to produce monodisperse and stable nanoparticles of metallic silver according to claim 1, wherein the second hydroxide is selected from the group consisting of hydroxide of sodium, hydroxide of potassium, hydroxide of ammonium, and ammonia.

8. The process to produce monodisperse and stable nanoparticles of metallic silver according to claim 1, wherein the third hydroxide is selected from the group consisting of hydroxide of sodium, hydroxide of potassium, hydroxide of ammonium, and ammonia.

\* \* \* \* \*